United States Patent
Villwock

(10) Patent No.: US 8,390,234 B2
(45) Date of Patent: Mar. 5, 2013

(54) METHOD FOR THE AUTOMATED STARTUP AND/OR FOR THE AUTOMATED OPERATION OF CONTROLLERS OF AN ELECTRICAL DRIVE SYSTEM WITH VIBRATIONAL MECHANICS AS WELL AS AN ASSOCIATED DEVICE

(75) Inventor: Sebastian Villwock, Rosstal (DE)

(73) Assignee: Baumuller Nurnberg GmbH, Nuremberg (DE)

( * ) Notice: Subject to any disclaimer, the term of this patent is extended or adjusted under 35 U.S.C. 154(b) by 228 days.

(21) Appl. No.: 12/829,429

(22) Filed: Jul. 2, 2010

(65) Prior Publication Data

US 2011/0001448 A1   Jan. 6, 2011

(30) Foreign Application Priority Data

Jul. 6, 2009  (EP) .................................. 09164670

(51) Int. Cl.
*G05B 13/00*   (2006.01)
(52) U.S. Cl. ................... 318/561; 318/806; 318/400.33; 318/400.11; 318/400.12; 702/115; 702/34; 702/145; 126/573; 126/574; 126/600; 126/601; 126/903; 324/332; 358/426.12; 358/426.08; 703/7; 703/2; 703/14
(58) Field of Classification Search .................. 318/561, 318/806, 400.33, 400.11, 400.12; 702/115, 702/34, 145; 703/7, 2, 14; 358/426.12, 426.08; 343/793; 324/332; 342/22, 27; 375/286, 375/353; 126/573, 574, 576, 600, 601, 603, 126/906
See application file for complete search history.

(56) References Cited

U.S. PATENT DOCUMENTS 8,104,893 B2 *   1/2012   Reznik et al. ..................... 353/3

FOREIGN PATENT DOCUMENTS

| DE | 100 46 005 A1 | | 4/2002 |
|---|---|---|---|
| DE | 10046005 A1 | * | 4/2002 |
| DE | 10 2004 050 903 A1 | | 2/2006 |
| DE | 102004050903 A1 | * | 2/2006 |
| WO | 2009/055624 A1 | | 4/2009 |

OTHER PUBLICATIONS

Industry Applications Conference, 2000. Conference Record of the 2000 IEEE, Date of Conference: 2000, Author(s): Wertz, H. Inst. for Power Electron. & Electr. Drives, Paderborn Univ, Schutte, F. vol. 3, on pp. 1497-1504 vol. 3.*
Wertz, H., Schutte, F., Self-tuning Speed Control for Servo Drives With Imperfect Mechanical Load, Industry Applications Conference, 2000, pp. 1497-1504.

* cited by examiner

*Primary Examiner* — Walter Benson
*Assistant Examiner* — Jorge Carrasquillo
(74) *Attorney, Agent, or Firm* — Frank H. Foster; Kremblas & Foster

(57) ABSTRACT

A method for automated startup and/or for automated operation of controllers of an electrical drive system with vibrational mechanics with the following steps: (a) determining a preliminary value of at least one parameter; (b) determining a model of the electrical drive system by determination of initially a non-parameterized model through the recording of frequency data during operation of the drive system subject to the utilization of the preliminary value of at least one parameter and the subsequent determination of parameters of the electrical drive system based on the frequency data and subject to optimization of at least one preliminary value of at least one parameter by a numerical optimization method on the basis of the Levenberg-Marquardt algorithm and (c) parameterizing at least one controller of the electrical drive system by at least one of the determined parameters.

8 Claims, 4 Drawing Sheets

METHOD FOR THE AUTOMATED STARTUP AND/OR FOR THE AUTOMATED OPERATION OF CONTROLLERS OF AN ELECTRICAL DRIVE SYSTEM WITH VIBRATIONAL MECHANICS AS WELL AS AN ASSOCIATED DEVICE

BACKGROUND OF THE INVENTION

The invention concerns a method for the automated startup and/or for the automated operation of controllers of an electrical drive system with vibrational mechanics as well as an associated device For the startup or the operation of controllers of electrical drive systems the values of operationally relevant parameters have to be determined. In many practical application cases the mechanical assembly of an electrical drive with vibrational mechanics can be modeled as a two-mass oscillator. It is thereby initially required to identify the drive system as such, meaning to determine a model for the drive system. Subsequently the parameterization of the controller of the drive system can take place on the basis of this identified model.

Basically the parameterization of the controller is all the more successful the more accurately the model describes the actual system of the drive system. The parameterization of the controller in general has an immediate effect on the progression of the process.

Approaches known so far from the literature start with the premise that for the drive assembly to be controlled the total start-up time or the moment of inertia is known. Insofar an a-priori knowledge of the system is presupposed. The total startup time can for example be determined by means of an estimate, as it is described in the dissertation of Frank Schütte with the title "Automatisierte Reglerinbetriebnahme für elektrische Antriebe mit schwingungsfähiger Mechanik" (Automated start-up of controllers for electrical drives with vibrational mechanics) of the University Paderborn from 2002.

The approach described there is based on the assumption that the actual system exhibits in the range of low frequencies between about 20 and 30 Hz the behavior of a one-mass system. The less this prerequisite is however actually fulfilled the less accurate is the estimate of the total startup time and the less accurate is therefore the thereon based optimization of the remaining system parameters for which the estimate of the total startup time is utilized.

An additional problem is the fact that the actual system, because of friction effects in the range of very low frequencies between about 1 and 10 Hz, does not exhibit a purely integral behavior as it is assumed in the theory. The determination of the total startup time in the case of very elastic systems with a resonance frequency on the order of 30 Hz or smaller is made hereby more difficult.

The invention therefore has as its purpose to provide a method that is improved in this regard as to the automated startup and/or for the automated operation of controllers of an electrical drive system with vibrational mechanics.

SUMMARY OF THE INVENTION

In order to solve this problem, a method of this sort is provided that features the following steps:
Determination of a preliminary value of at least one parameter,
Determination of a model of the electrical drive system by means of the determination of initially a non-parameterized model through the recording of frequency data during operation of the drive system subject to the utilization of the preliminary value of at least one parameter and the subsequent determination of parameters of the electrical drive system based on the frequency data and subject to the optimization of at least one preliminary value of at least one parameter by means of a numerical optimization method on the basis of the Levenberg-Marquardt algorithm and
Parameterization of the plurality of or at least one controller of the electrical drive system by means of at least one of the determined parameters.

The start-up of the controller according to the invention therefore structures itself after the estimation of the preliminary values of a parameter into two steps, whereby in the first step the generation of the model of the drive system takes place, while in the second step the concluding controller parameterization is accomplished. The model building or system identification for its part is, in the context of the method according to the invention, again two-staged or structured into two steps. The first stage a non-parameterized model is thereby determined in the form of the frequency response. The implementation of the frequency response measurement is followed by the determination of the system or model parameters subject to the utilization of the measured frequency response data. The numerical optimization method of Levenberg and Marquardt is utilized for this parameter determination.

In contrast to previously known methods the optimization in the second stage of the model building is, in the method according to the invention, also applied to a parameter value that is already determined preliminarily or with an approximate value, in particular estimated, for example based on initially available frequency response data or a measured amplitude response or also in the context of a calculation. It is therefore in the context of the invention for example the total startup time or the moment of inertia of the mechanical drive assembly, which in conventional approaches are estimated or whose a-priori knowledge in some approaches is also simply presupposed, that are themselves subject to an optimization, so that the method according to the invention offers the advantage that the errors arising from a pure estimate of a corresponding value can be avoided or that no (exact) a-priori knowledge about the electrical drive system has to exist. At least one parameter is therefore initially estimated in the context of the invention. With this parameter the controller can be preliminarily or "coarsely" parameterized in such a manner that it is possible to operate the drive. Then follows the measurement of the frequency response, wherefore the drive has to be at least fundamentally capable of running. The frequency response measurement is followed by the parameter optimization or the parameter fitting, whereby preferably all model parameters that describe the system are determined on the basis of the measured frequency response data. This optimization encompasses, according to the invention, also the initially preliminarily or "coarsely" identified parameter. As a result a model of the drive is obtained with all identified system parameters. This serves in the course of the start-up the optimized parameterization of the controller.

The optimization method therefore delivers as a result not only the remaining system parameters but also an optimized starting parameter that, based on for example already present frequency response data or based on theoretical considerations or comparative data, was able to be determined to a first approximation but subsequently was further optimized in the context of the execution of the optimization algorithm so that errors in the approximation that, as the case may be, could have a large negative effect on the parameterization of the controller are largely avoided.

With the invention it is also possible to improve the accuracy and the reliability in the context of the modeling of drive trains. An a-priori knowledge of the drive assembly that is to be modeled or to be parameterized is no longer required. With the improved automated modeling of the drive trains the subsequent automated parameterization of the controller is also accomplished better. This leads to the end effect of an improvement of the controller behavior and can therefore finally lead to an improvement of the respective application, because in regard to the application the main requirement is usually to achieve the highest possible bandwidth of the controlled system, whereby one has to watch for adequate robustness in regard to parameters of the controlled system that change during operation.

The invention makes it possible to take into account the contrary demands of a highly dynamic speed control in the context of primarily short control times and low excess vibration bandwidth on the one hand and the demands of the robustness relative to system characteristics that not modeled and parameters that were not identified exactly on the other. In this area no control dynamic must be given away through inaccurate modeling of the actual system, which is taken into consideration in the context of the present invention.

In this context the invention is particularly helpful in the event when varying process parameters appear so that a robust identification routine has to be deployed that could possibly also be deployed during the running operation of the installation or for a renewed identification and therefore has to get along without a-priori knowledge of the controlled system. Because during the running operation and in similar cases it is no possible to perform a start-up test or other comparable tests. A typical case for this is when a model follower control has to be realized. In the case of such a control strategy a continuous comparison between the calculated model of the controlled system and the actual system is performed.

A in the case of very elastic systems necessarily erroneous approximation of the total moment of inertia of the assembly from initially determined frequency response data can therefore be corrected in the context of the invention by means of the subsequent optimization process. Therefore the requirement of complementary additional tests, in particular highspeed tests, is no longer necessary.

According to the invention a two-mass oscillating system can be used as a model of the electrical drive system and/or the model of the electrical drive system can be determined without an a-priori knowledge of the electrical drive system. The modeling of the mechanical assembly of a drive as a two-mass oscillator is useful in the context of many practical application cases. In the case of the method according to the invention the advantage is that no prior knowledge of the electrical drive system is required for its implementation. The method is therefore executed with particular advantage in such a manner that besides the parameter, for which a preliminary estimate is determined based on the first frequency response data or another first approximation, that was optimized further by means of the Levenberg-Marquardt algorithm, and that was not exactly known previously, no other parameters of the system have to be known, so that all system parameters in the end emerge from the optimization method. Additional tests for the purpose of the determination of parameters are therefore no longer necessary.

In particular it is useful if in the case of the present invention as preliminary value of a parameter a total startup time of the electrical drive system is estimated, in particular from frequency response data in the range of small frequencies, and is used as the starting value for the numerical optimization method on the basis of the Levenberg-Marquardt algorithm The total startup time is a value that in previous approaches is determined a-priori or according to certain methods without the estimated value itself being checked again. In the case of the invention however the preliminary value of the total startup time, which is composed of the sum of the total startup time of the motor and the total startup time of the load, is itself inserted into the optimization algorithm as a value to be optimized and is further improved in context of the algorithm in order to obtain in the end an optimal value of the total startup time that is close to reality and to avoid errors, which could have grave effects on the process response of the system, in the determination.

According to the invention a preliminary value of the total startup time can be estimated based on the quotient of the number of measured values of a partial signal sequence and the sum of the contributions of a general transfer function depending on angular frequencies from 1 to the number of measured values, to which the total startup time is proportional.

The estimation of the moment of inertia of the entire mechanical drive assembly, which multiplied with the mechanical nominal angular velocity $\Omega_N$ and divided by the nominal torque $M_N$ results in the total startup time, therefore follows accordingly corresponding to the equation in the dissertation by Schütte that was mentioned in the beginning $$\hat{J}_{ges} = \frac{L}{\sum_{i=1}^{L} |G_{mech}(j\omega_i)|},$$

whereby L is the number of the measured values of the partial signal sequence and $G_{mech}(j\omega_i)$ stands for the general transfer function.

The general transfer function of an elastic two-mass systems is defined as $$G_{mech}(s) = \frac{\omega_M(s)}{m_M(s)} = \frac{1}{s \cdot (T_M + T_L)} \cdot \frac{T_L \cdot T_C \cdot s^2 + d \cdot T_C \cdot s + 1}{\frac{T_L \cdot T_C \cdot T_M}{T_M + T_L} \cdot s^2 + d \cdot T_C \cdot s + 1},$$

whereby the $\omega_M(s)$ is the angular motor velocity while $m_M(s)$ represents the drive torque. s is a complex parameter, $T_M$, $T_L$, $T_C$ and d is a system parameter to be identified. $T_M$ represents the startup time of the motor, $T_L$ the startup time of the load, $T_C$ a normalized spring constant and d the normalized material damping of the spring.

If now the total startup time of the system, namely $$T_{ges} = T_M + T_L.$$

of the mechanical drive assembly known a-priori or if the associated moment of inertia $J_{ges}$ were known, one could define because of $$T_{ges} = J_{ges} \cdot \Omega_N / M_N$$

a reduced transfer function, whereby $\Omega_N$ is the mechanical nominal angular velocity and $M_N$ is the nominal torque. This reduced transfer function would then yield $$G_{ms}(s) = G_{mech}(s) \cdot s \cdot T_{ges}$$

$$= \frac{T_L \cdot T_C \cdot s^2 + d \cdot T_C \cdot s + 1}{\frac{T_L \cdot T_C \cdot T_M}{T_M + T_L} \cdot s^2 + d \cdot T_C \cdot s + 1}$$

$$= \frac{a_3 \cdot s^2 + a_2 \cdot s + 1}{a_1 \cdot s^2 + a_2 \cdot s + 1}$$

where $a_1$, $a_2$ and $a_3$ are coefficients that can be assembled to a parameter vector $\vec{a}$. $T_M$ in the coefficient $a_1$ is substituted for by the relation $T_M = T_{ges} - T_L$.

A prerequisite for the stated substitutions is however that the total startup time is either known from the start or is determined from a separate measurement such as a start-up test.

The stated approximation of the total startup time from a measured amplitude response in the range of smaller frequencies is based on the assumption that the actual system exhibits in the range of low frequencies up until about 30 Hz the behavior of a one-mass system. If this prerequisite is not satisfied, the approximation of the total startup time is all the less accurate the higher the deviation from the behavior of the one-mass system is. As a result the optimization of the remaining system parameters, into which the approximation of the total startup time enters, is correspondingly less accurate. Added to this is the problem that the actual system, because of friction effects in the range of very low frequencies between about 1 and 10 Hz, does not exhibit a purely integral behavior as it is assumed in the theory.

According to the invention, in the context of the numerical optimization method on the basis of the Levenberg-Marquardt algorithm, a parameter vector of three coefficients of a reduced transfer function of an elastic two-mass oscillator model and/or a total startup time of the electrical drive system can be determined as a parameter.

Advantageously the determination of the three parameters $a_1$, $a_2$ and $a_3$ as well as the total startup time $T_{ges}$ is accomplished together. On the one hand therefore the system parameters, which can be combined to one parameter vector $\vec{a}$, are optimized and on the other implicitly an additional optimization of the total startup time, which was initially estimated or which was (by means of estimation or by other means) determined preliminarily, is accomplished. By means of the additional optimization of the startup time or another suitable parameter, errors that were present during the provision of the starting value of this parameter, therefore for example errors in the approximation of such a parameter, do not negatively affect the remaining determination of parameters since the preliminary parameter value is optimized together with the remaining system parameters. Consequently a significantly improved determination of the process parameters is finally possible.

For the determination of the parameter vector of the three coefficients of the reduced transfer function of an elastic two-mass oscillator model and the total startup time of the electrical drive system the numerical optimization method on the basis of the Levenberg-Marquardt algorithm of the reduced transfer function can be expanded to the general transfer function of the elastic two-mass oscillator model.

The total startup time is, as described, estimated in the sense of the generation of a starting value for the iterative Levenberg-Marquardt algorithm, then however identified in the context of the optimization process by means of the Levenberg-Marquardt method in order to obtain a, on the whole, more robust method for the parameterized modeling of the two-mass oscillators that does not demand a-priori knowledge of the parameter total startup time. One should thereby take note that the optimization of the total startup time cannot be added separately from the prior optimization of the parameters $a_1$, $a_2$ and $a_3$. In order to thereby utilize the improved controller response and therefore the technical advantage of the invention, it is required that the mathematical equations are expanded for the optimization method from the reduced transfer function $G_{nrs}$ to the general transfer function $G_{mech}$. The index "nrs" of the reduced transfer function stands thereby for "non rigid system", or for the description of the part of the mechanics that is capable of oscillating.

In the context of the numerical optimization method on the basis of the Levenberg-Marquardt algorithm an error function can be evaluated that is based on the difference between the frequency response that was measured in the context of the recording of the frequency response data and the model function that was determined in the context of the model determination and which depends on the three coefficients of the reduced transfer function of an elastic two-mass oscillator model and the total startup time of the electrical drive system.

Accordingly the modified Hesse matrix that contains the derivations of the error function according to the determined parameters of the electrical drive system in the form of the three coefficients of the reduced transfer function and the total startup time of the electrical drive system and the gradient vector, which are utilized for the calculation of a correction vector of a respective iteration step of the Levenberg-Marquardt algorithm, are suitably expanded to four-dimensional relations. The correction vector of the respective iteration step results thereby from the multiplication of the inverse modified Hesse matrix with the gradient vector.

The error function to be evaluated is therefore $$\chi^2(\vec{a}) = \sum_{i=1}^{N} |G_{Mess,i}(j\omega_i) - G_{Modell,i}(j\omega_i, \vec{a}, T_{ges})|^2$$

or $$\chi^2(\vec{a}) = \sum_{i=1}^{N} \left| G_{Mess,i}(j\omega_i) - \frac{1}{T_{ges}} \cdot \frac{-2a_2\omega^2 + (a_2 a_3 - a_2)\omega^4 + j[\omega + \omega^3(1 - a_3 - a_2^2) - a_3\omega^5]}{(a_2\omega^2)^2 + (\omega^3 + \omega)^2} \right|^2.$$

$G_{Mess,i}(j\omega_i)$ in this context stands for the measured frequency response. The modeled function is represented through $G_{Modell,i}(j\omega_i, \vec{a}, T_{ges})$. The functions are here no longer indicated as depending on the complex parameter s but instead as depending on the imaginary angular frequency $j\omega_i$.

As mentioned, the modified Hesse matrix $\underline{A}_{mod}$ as well as the gradient vector $\vec{\beta}$, which contain the derivations of the error function according to the system parameters that were taken into account, are expanded to four-dimensional relations. From the modified Hesse matrix and the gradient vector a correction vector $\vec{\delta}$ is then determined according to $$\vec{\delta} = \underline{A}_{mod}^{-1} \vec{\beta}$$

The four-dimensional relations for the modified Hesse matrix and the gradient vector are $$A_{mod} = A + \Delta \lambda I = \begin{pmatrix} \frac{\partial^2 \chi^2(\vec{a}, T_{ges})}{\partial a_1 \partial a_1} \cdot (1+\lambda) & \frac{\partial^2 \chi^2(\vec{a}, T_{ges})}{\partial a_1 \partial a_2} & \frac{\partial^2 \chi^2(\vec{a}, T_{ges})}{\partial a_1 \partial a_3} & \frac{\partial^2 \chi^2(\vec{a}, T_{ges})}{\partial a_1 \partial T_{ges}} \\ \frac{\partial^2 \chi^2(\vec{a}, T_{ges})}{\partial a_2 \partial a_1} & \frac{\partial^2 \chi^2(\vec{a}, T_{ges})}{\partial a_2 \partial a_2} (1+\lambda) & \frac{\partial^2 \chi^2(\vec{a}, T_{ges})}{\partial a_2 \partial a_3} & \frac{\partial^2 \chi^2(\vec{a}, T_{ges})}{\partial a_2 \partial T_{ges}} \\ \frac{\partial^2 \chi^2(\vec{a}, T_{ges})}{\partial a_3 \partial a_1} & \frac{\partial^2 \chi^2(\vec{a}, T_{ges})}{\partial a_3 \partial a_2} & \frac{\partial^2 \chi^2(\vec{a}, T_{ges})}{\partial a_3 \partial a_3}(1+\lambda) & \frac{\partial^2 \chi^2(\vec{a}, T_{ges})}{\partial a_3 \partial T_{ges}} \\ \frac{\partial^2 \chi^2(\vec{a}, T_{ges})}{\partial T_{ges} \partial a_1} & \frac{\partial^2 \chi^2(\vec{a}, T_{ges})}{\partial T_{ges} \partial a_2} & \frac{\partial^2 \chi^2(\vec{a}, T_{ges})}{\partial T_{ges} \partial a_3} & \frac{\partial^2 \chi^2(\vec{a}, T_{ges})}{\partial T_{ges} \partial T_{ges}}(1+\lambda) \end{pmatrix}$$

or $$\vec{\beta} = -\frac{1}{2} \cdot grad(\chi^2(\vec{a}, T_{ges})) = \begin{pmatrix} \frac{\partial \chi^2(\vec{a}, T_{ges})}{\partial a_1} \\ \frac{\partial \chi^2(\vec{a}, T_{ges})}{\partial a_2} \\ \frac{\partial \chi^2(\vec{a}, T_{ges})}{\partial a_3} \\ \frac{\partial \chi^2(\vec{a}, T_{ges})}{\partial T_{ges}} \end{pmatrix}.$$

As a general transfer function in the context of the method the quotient of the angular velocity of the motor and the drive torque and/or as reduced transfer function the product of the general transfer function with a complex factor and the total startup time of the electrical drive system can be utilized.

For the optimization of all system parameters in the context of the optimization method subject to the utilization of the Levenberg-Marquardt algorithm the general transfer function that was expanded to the corresponding total number of system parameters is utilized. In this appears with the sum of the startup time of the motor and the startup time of the load the startup time of the entire system. In the context of the reduced transfer function in previous approaches a substitution of the startup time of the mass in the first coefficient of the parameter vector was frequently implemented on the assumption that the total startup time is known.

In the context of the method a transfer function can be utilized that depends on the startup time of the motor, the startup time of the load, the normalized spring constant and the normalized spring damping of the electrical drive system, and/or as parameter a parameter vector can be utilized that consists of the three coefficients a) product of the startup time of the motor and the load with the normalized spring constant divided by the sum of the startup time of the motor and the load $(T_L*T_C*T_M)/(T_M+T_L)$, b) product of the normalized spring damping and the normalized spring constant, $d*T_C$, as well as c) product of the startup time of the load and the normalized spring constant, $T_L*T_C$. This vector can be written as parameter vector $\vec{a}$.

The determination of parameters of the electrical drive system on the basis of the frequency response data and subject to the optimization of at least one preliminary value of at least one parameter by means of a numerical optimization method on the basis of the Levenberg-Marquardt algorithm can be implemented during the running operation of the electrical drive system, in particular in such a manner that all parameters of the electrical drive system or drive train are determined and/or optimized, including the at least on preliminary, preferably initially estimated, parameter value. The renewed approximation or such like of the at least one preliminary value of at least one parameter is not required since it can be optimized during the operation of the installation according to the invention. As a result the application of the invention offers itself for example in the case of varying parameter values and/or in the context of subsequent model adjustment.

According to the invention in the case of for example varying process parameters, because of the robustness of the method according to the invention, no renewed startup test or such like has to be performed in order to (again) implement a reliable identification of the model parameter. A model determination is therefore also possible during the running operation of an installation without a-priori knowledge of the controlled system. This is for example important in the case of a subsequent model adjustment during which a continuous comparison between a calculated model of the controlled system and the actual system is performed.

According to the invention the order of the system model is expanded by one in comparison to previous approaches so that the source code to be implemented in the drive system is to be expanded from a source code for a three-dimensional to the source code of a four-dimensional problem. For this purpose a newly derived algorithm to be implemented is provided, as described.

Furthermore the invention concerns a device for the automated startup and/or for the automated operation of controllers of an electrical drive system with vibrational mechanics, in particular according to a method as described previously, with means that are implemented for the determination of a preliminary value of at least one parameter, for the determination of a model of an electrical drive system by means of a determination of an initially non-parametric model by means of recording of frequency response data during operation of the electrical drive system subject to the utilization of the preliminary value of at least one parameter and for the subsequent determination of parameters of the electrical drive system based on the frequency response data and subject to the optimization of at least one preliminary value of at least one parameter by means of a numerical optimization method on the basis of the Levenberg-Marquardt algorithm and for the parameterization of the plurality of or at least one controller of the electric drive system by means of at least one of the determined parameters.

Furthermore the invention concern also an electrical drive system or a corresponding installation with an electrical drive system with vibrational mechanics with a device for the automated startup and/or for the automated operation of controllers as previously described and/or designed with means for the implementation of the method as is was described above.

The device for the automated startup and/or for the operation of the controller or the electrical drive system with the device or a corresponding installation feature therefore suitable control and/or adjustment means, with the aid of which, for example subject to the utilization of a computing installation or such, a model determination for the electrical drive system is possible or with which an activation of the controllers via the parameters determined by means of the model and/or a conveying of the parameters to the controllers can be accomplished. If applicable the controllers themselves can also feature means for the determination of the parameters, such as by being for example equipped with their own processors or computing installations. The model determination and/or parameterization can therefore be accomplished respectively according to the design of the controller external to the controller and/or internal to the controller.

BRIEF DESCRIPTION OF THE SEVERAL VIEWS OF THE DRAWINGS

Further advantages, characteristics, and details of the invention are specified in the following embodiment example as well as from the drawings. It is thereby shown.

DETAILED DESCRIPTION OF THE INVENTION

Figure 1:
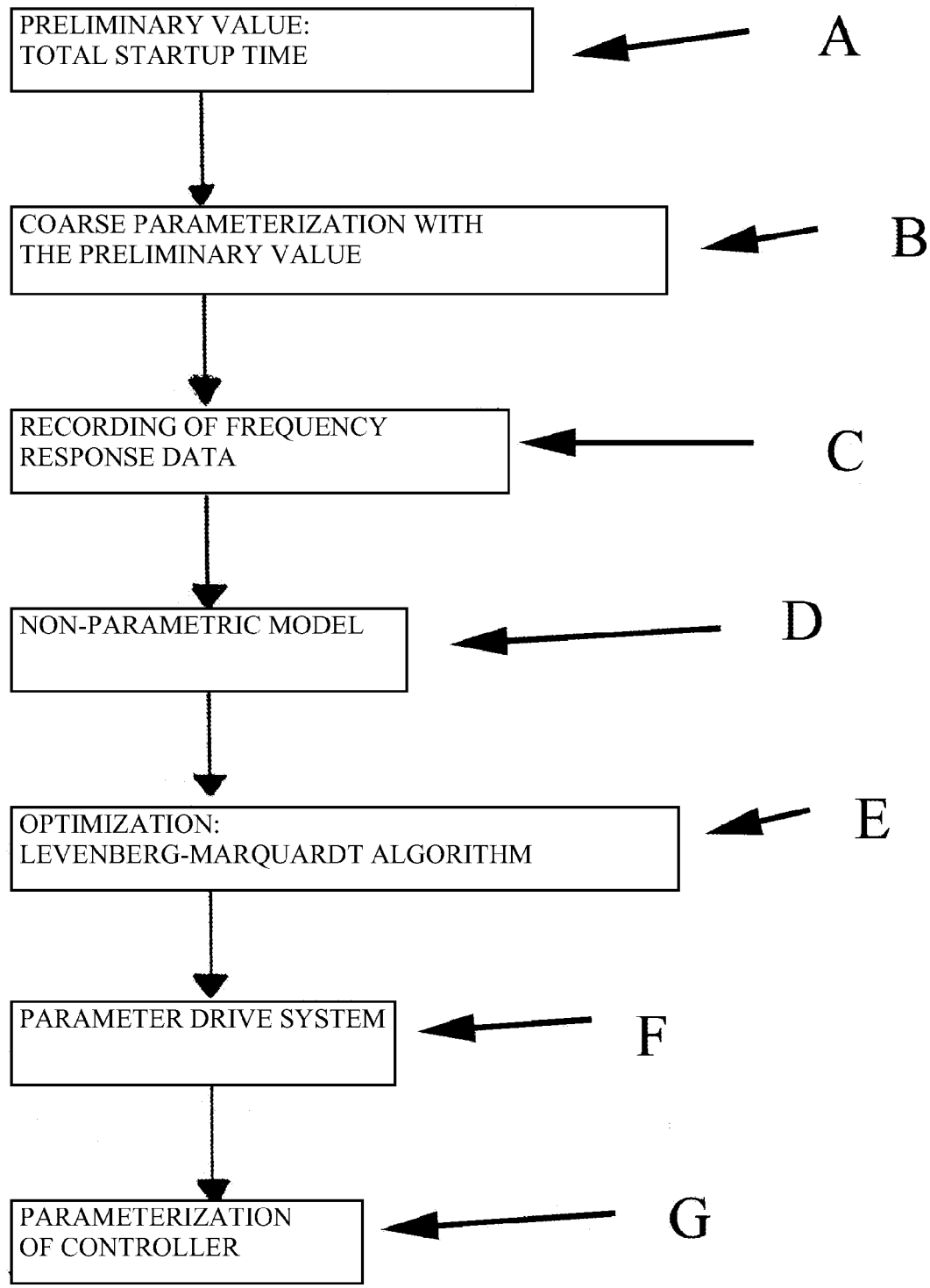
FIG. 1 an overview sketch for the implementation of a method according to the invention, FIG. 2 a representation of the amplitude response of a two-mass oscillator and a corresponding approximation as a one-mass system according to prior art, FIG. 3 measured frequency response data of a mechanical assembly and an associated coherence function and FIG. 4 the frequency response of a two-mass test bench and an associated model function according to prior art.

In FIG. 1 an overview sketch for the implementation of a method according to the invention is shown.

Thereby an initial determination of a preliminary value of the total startup time is accomplished in the context of the automated startup of controllers of the electrical drive system with vibrational mechanics according to box A. This approximation can be based for example on the data of an amplitude response. The preliminary value of the total startup time serves according to box B for the coarse initial parameterization of the adjustment in order to initially be able to fundamentally implement the operation of the installation. With this accomplished, compare box C, the recording of the frequency response data can follow since for this measurement the prerequisite is that the drive is at least basically capable of running. The frequency response data serve, as box D indicates, as non-parametric model of the drive system.

The parameter optimization follows the frequency response measurement according to box E. Hereby all model parameters of the system are optimized on the basis of the measured frequency response data, including the preliminary value of the total startup time. The optimization algorithm is, according to the invention, a Levenberg-Marquardt algorithm during the execution of which the preliminarily estimated parameter value is utilized as a starting value. The optimization algorithm is therefore executed in such a manner that the preliminary value of the total startup time is (further) optimized next to the remaining system parameter, meaning in general a parameter vector $\vec{a}$ with the three components $a_1$, $a_2$ and $a_3$.

As a consequence there are four optimized parameter values of the drive system (compare box F) in the result, namely an optimized total startup time and an optimized parameter vector $\vec{a}$ with the three named vector components.

These optimized parameters of the electrical drive system are then utilized for the parameterization of the controller according to box G. The method according to the invention thereby offers the advantage that the total startup time from the box A represents simply the start value that is further optimized in the later course of the process so that also during the running operation of the installation, for example in the case of varying parameter values, a renewed determination of optimized parameters can be made since an a-priori value for the startup time does not have to be especially determined or a total startup time has to be determined from a startup test, but instead values that were once estimated can be further optimized together with the remaining system parameters according to the current circumstances.

Figure 2:
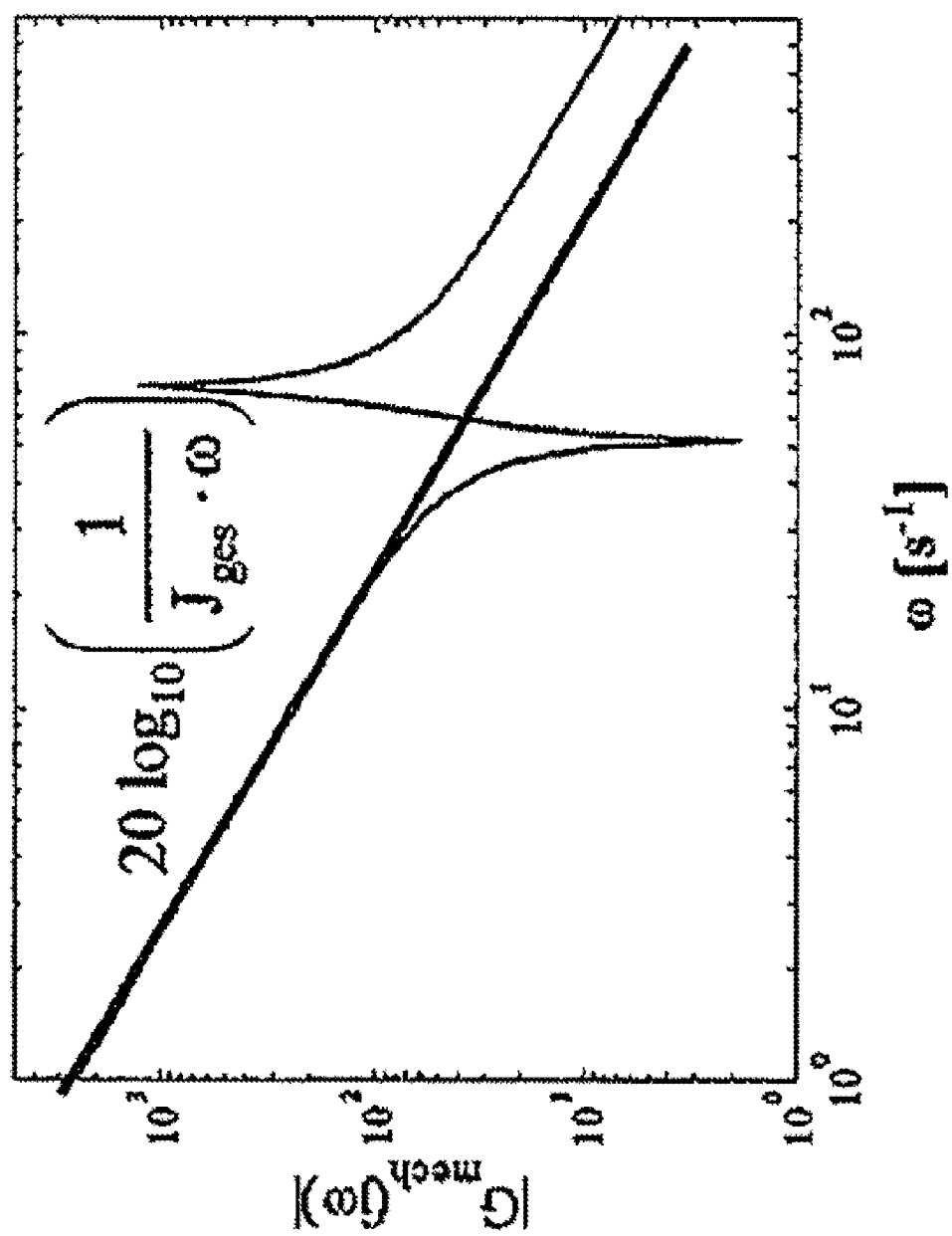

FIG. 2 displays a representation of the amplitude response of a two-mass oscillator and a corresponding approximation as a one-mass system according to prior art, Along the abscissa the angular frequency is thereby plotted, along the ordinate the value of the general transfer function. The approximation that is, according to the invention, used as the starting value determination for the Levenberg-Marquardt algorithm contains insofar errors as the prerequisite for the estimation is that the actual system must exhibit in the low frequency range between 20 and 30 Hz the response of a one-mass system, whereby the estimation is increasingly less accurate the less this prerequisite is satisfied. Since in the context of the method for the startup of the controller according to the invention however not only an optimization of the remaining system parameters occurs, but also that of the estimated start value, the parameter determination is accomplished on whole significantly better than in the case of conventional methods.

Figure 3:
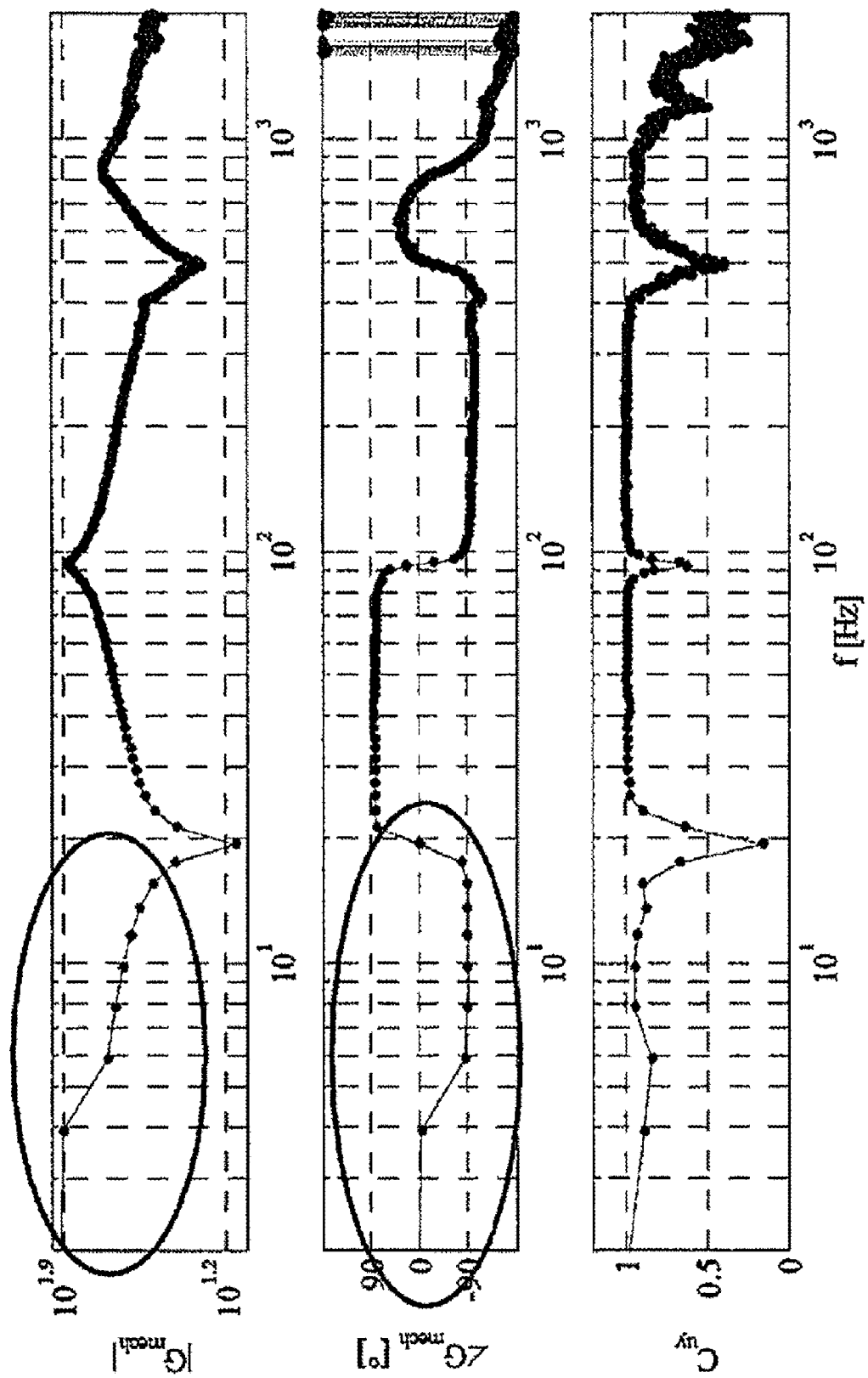

The FIG. 3 presents measured frequency response data of a mechanical assembly and an associated coherence function, whereby here the frequency is plotted on the abscissa in Hz, on the ordinate the spring constant $C_{uy}$, as well as the general transfer function (in degrees) or the value of the general transfer function.

The actual system exhibits as a result of frictional effects in the very low frequency range of about 1 to 10 Hz no integral response, as demanded by theory. This makes the determination of the total startup time more difficult in the case of very elastic systems with a resonance frequency $f_{res}$ on the order of magnitude of 30 Hz or smaller. The frequency response in FIG. 3 demonstrates that the system up to the first absorption frequency does not exhibit the response of a one-mass system, where the amplitude response must demonstrate the characteristic slope of −20 dB/decade. Above the absorption frequency an approximation of the drive train as a one-mass system is no longer possible.

Figure 4:
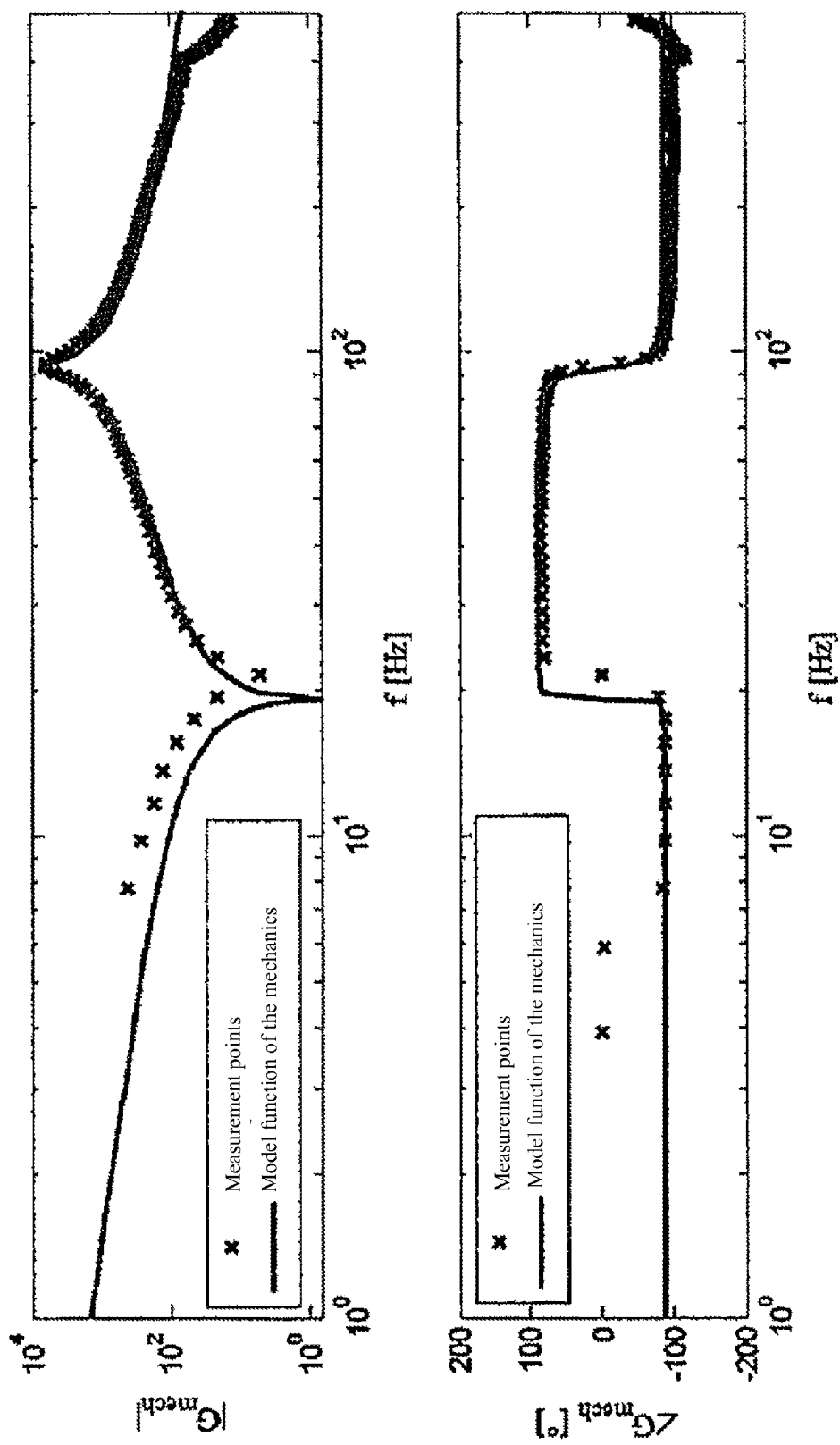

In FIG. 4 the frequency response of a two-mass test bench and an associated model function according to prior art is shown. Along the abscissa the angular frequency is plotted, along the ordinate correspondingly the general transfer function in degrees or the value of the general transfer function. The model function that was determined with approaches according to the prior art does exhibit above the absorption frequency a reasonable agreement with the measured frequency response, below the absorption frequency however deviations can be recognized. The rule thereby applies that the more elastic the mechanical assembly is, the stronger the estimate of the total moment of inertia model will affect the modeling. By means of the optimization according to the invention of the total startup time together with the remaining system parameters such problems can be avoided or significantly reduced particularly in the case of elastic assemblies. A on the whole more robust method for the parameterized modeling of two-mass oscillators is thereby generated without that a-priori knowledge of the total startup time or additional parameters would be required.

LIST OF REFERENCE SYMBOLS

A-G Boxes of the course of the process

The invention claimed is:

1. Method for automated startup or for automated operation of controllers of an electrical drive system with vibrational mechanics, the method comprising the following steps:
   a. determining a preliminary value of at least one parameter,
   b. determining a model of the electrical drive system by means of determination of initially a non-parameterized model through recording of frequency data during operation of the drive system subject to the utilization of the preliminary value of at least one parameter and the subsequent determination of parameters of the electrical drive system based on the frequency data and subject to the optimization of at least one preliminary value of at least one parameter by means of a numerical optimization method on the basis of Levenberg-Marquardt's algorithm and
   c. parameterizing at least one controller of the electrical drive system by means of at least one of the determined parameters;
wherein a two-mass oscillating system is used as a model of the electrical drive system or the model of the electrical drive system is determined without a-priori knowledge of the electrical drive system;
wherein as a preliminary value of a parameter a total startup time of the electrical drive system is estimated, from frequency response data in the range of small frequencies, and is used as the starting value for the numerical optimization method on the basis of the Levenberg-Marquardt algorithm; and
wherein a preliminary value of the total startup time is estimated based on the quotient of the number of measured values of a partial signal sequence and the sum of the contributions of a general transfer function depending on angular frequencies from 1 to the number of measured values, to which the total startup time is proportional.

2. Method according to claim 1, wherein in the context of the numerical optimization method on the basis of the Levenberg-Marquardt algorithm, a parameter vector of three coefficients of a reduced transfer function of an elastic two-mass oscillator model or a total startup time of the electrical drive system is determined as a parameter.

3. Method according to claim 2, wherein for the determination of the parameter vector of the three coefficients of the reduced transfer function of an elastic two-mass oscillator model and total startup time of the electrical drive system the numerical optimization method on the basis of the Levenberg-Marquardt algorithm is expanded from the reduced transfer function to the general transfer function of the elastic two-mass oscillator model.

4. Method according to claim 3, wherein in the context of the numerical optimization method on the basis of the Levenberg-Marquardt algorithm an error function is evaluated that is based on the difference between the frequency response that was measured in the context of the recording of the frequency response data and the model function that was determined in the context of the model determination and which depends on the three coefficients of the reduced transfer function of an elastic two-mass oscillator model and the total startup time of the electrical drive system.

5. Method according to claim 4, wherein the modified Hesse matrix that contains the derivations of the error function according to the determined parameters of the electrical drive system in the form of the three coefficients of the reduced transfer function and the total startup time of the electrical drive system and the gradient vector, which are utilized for the calculation of a correction vector of a respective iteration step of the Levenberg-Marquardt algorithm, are expanded to four-dimensional relations.

6. Method according to claim 5, wherein as a general transfer function in the context of the method the quotient of the angular velocity of the motor and the drive torque or as reduced transfer function the product of the general transfer function with a complex factor and the total startup time of the electrical drive system is utilized.

7. Method according to claim 6, wherein in the context of the method a transfer function is utilized that depends on the startup time of the motor, the startup time of the load, the normalized spring constant and the normalized spring damping of the electrical drive system, or that as a parameter a parameter vector is utilized that consists of the three coefficients a) product of the startup time of the motor and the load with the normalized spring constant divided by the sum of the startup time of the motor and the load, b) product of the normalized spring damping and the normalized spring constant as well as c) product of the startup time of the load and the normalized spring constant.

8. Method according to claim 7, wherein the determination of the parameters of the electrical drive system based on the frequency response data and subject to optimization of at least one preliminary value of at least one parameter by means of a numerical optimization method on the basis of the Levenberg-Marquardt algorithm is implemented during the running operation of the electrical drive system in such a manner that all parameters of the electrical drive system are determined or optimized, including the at least one preliminary, preferably initially estimated, parameter value.

* * * * *